Patented Aug. 14, 1945

2,382,876

UNITED STATES PATENT OFFICE 2,382,876

ETHERS OF VITAMIN B6

Stanton A. Harris, Westfield, N. J., assignor to Merck & Co., Inc., Rahway, N. J., a corporation of New Jersey No Drawing. Application December 12, 1942, Serial No. 468,824

8 Claims. (Cl. 260—297.5)

In general, this invention relates to organic chemical compounds possessing the property of promoting the growth of living organisms, and to processes for preparing said compounds. The invention, in a more particular sense is concerned with compounds, together with processes for their preparation, that can be represented by the formula

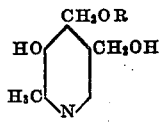

wherein R is selected from the class consisting of alkyl, aryl, and arylalkyl groups.

This case is a continuation-in-part of the copending application of the same inventor, Serial No. 267,603, filed April 13, 1939.

In accordance with one embodiment of the present invention, derivatives of vitamin B6 wherein the 4-hydroxymethyl substituent is replaced by a 4-alkoxymethyl, a 4-aryloxymethyl or a 4-arylalkoxymethyl substituent are obtained by using, as a starting material in the synthesis of the vitamin, an alkyl, aryl, or arylalkyl substituted acetyl acetone. This process can be represented as follows:

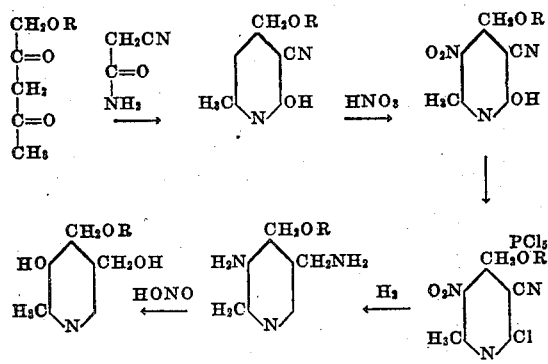

R represents alkyl, aryl or arylalkyl.

In accordance with another embodiment of the present invention, derivatives of vitamin B6 wherein the 4-hydroxymethyl substituent is replaced by a 4-alkoxymethyl or 4-arylalkoxymethyl substituent are obtained by condensing the vitamin at an elevated temperature with the alcohol or arylhydroxyl compound corresponding to the desired substituent. The condensation is effected by heating the reactants together, preferably by refluxing them for a period sufficient to assure formation of the desired quantities of product.

The following examples illustrate methods of carrying out the present invention, but it is to be understood that these examples are given by way of illustration and not of limitation.

Example 1

To 65.3 g. of cyanoacetamide, dissolved in 500 cc. of hot 95% alcohol, 93.1 g. of ethoxyacetylacetone and ca. 8.5 cc. of piperidine are added with shaking. Since the mixture becomes warm, it is necessary to cool the solution. Crystals soon appear. The mixture is allowed to stand overnight, cooled and filtered. The product is washed with 95% alcohol. The yield of white crystals is about 92 g. or 81%, M. P. 209–210°, corr. The product is purified by crystallization from boiling 95% alcohol; M. P. 210°.

5 gms. of 3-cyano-4-ethoxymethyl-6-methyl-2-pyridone in 13 cc. of acetic anhydride is cooled in ice and treated with 2.16 cc. of fuming nitric acid in 2 cc. of acetic anhydride with a little urea. The solid gradually goes into solution and heats up to 40–45° C. It is cooled to 25° C. and allowed to stand until no more heating effect is noticed. Upon pouring onto ice, crystallization of 3-cyano-4-ethoxy-methyl-5-nitro-6-methyl - 2 - pyridone takes place. It is dissolved in ammonium hydroxide and recrystallized by adding hydrochloric acid. It can be recrystallized from water, alcohol, benzene, ethyl acetate, etc., M. P. 164–165° C. It is nearly insoluble in ether and petroleum ether.

As an alternative method, to 40 gms. (.206 M) of 3-cyano-4-ethoxymethyl-6-methyl-2-pyridone is added enough acetic anhydride to make a paste. The mixture is then heated on a water bath to 70° C. To this mixture is added a solution of ferric nitrate in acetic anhydride (60 gms. of Fe(NO3)3.9H2O in 250 cc. of acetic anhydride) drop by drop with stirring and maintaining the temperature between 70°–80° C. The mixture at first turns reddish in color and then a reddish homogeneous solution results. Near the end of the reaction a precipitate appears. After all the ferric nitrate soluton has been added, the solution is stirred and maintained between 70°–80° C. for about 15 minutes. When the reaction is complete, the solution is poured into a beaker of cracked ice with stirring. A precipitate of the nitrated compound appears. This is filtered and washed with water. The precipitate is then dissolved in dioxane, treated with charcoal and filtered. To the yellowish dioxane solution, water is added until precipitation of the nitro compound is complete. It is then filtered and dried. Melting point 164–165° C. Yield=21 gms. or 43% of theory.

A mixture of 60 gms. of 3-cyano-4-ethoxymethyl-5-nitro-6-methyl-2-pyridone, 66 gms. of phosphorus pentachloride (25% excess) and 510 cc. of dry chlorbenzene are heated with a small flame until solution is effected. The flame is adjusted so that the phosphorus oxychloride, hydrogen chloride and chlorobenzene distill off slowly from the mixture at normal pressure. After about one-half the solvent has been removed (4–5 hrs.), the evolution of hydrogen chloride practically stops. The remaining solvent is removed under reduced pressure (10 mm.) leaving a brown viscous residue. To this cooled residue is added about 100 cc. of water and 20 cc. of ethanol in order to decompose any unreacted phosphorus pentachloride. The residue and the water are simultaneously extracted eight or ten times with petroleum ether. The petroleum ether extract is concentrated on the steam bath, first at atmospheric pressure and finally at about 1 mm. pressure in order to remove the last traces of chlorobenzene which interfere with subsequent crystallization. This residue is dissolved in about 50 cc. of 95% ethanol, cooled and seeded. A little water is added slowly to reduce the solubility of the product, but if too much water is added an oily precipitation occurs. The product is filtered off and recrystallized from alcohol, using charcoal to remove the color. One or two additional recrystallizations are necessary to completely remove the color, but are not necessary as far as the utility of the product for the next step in this synthesis is concerned.

The yield of 2-methyl-3-nitro-4-ethoxymethyl-5-cyano-6-chlorpyridine is 20 gms. or 31% of theory. About 10% more material can be obtained from the mother liquor; M. P. 47–48° C.

25.5 gms. of 2-methyl-3-nitro-4-ethoxymethyl-5-cyano-6-chlorpyridine is dissolved in 300 cc. of 95% alcohol and reduced with 0.5 gm. PtO$_2$ catalyst and hydrogen at three atmospheres pressure. Reduction is stopped after adsorption of three moles of hydrogen (one-half hour), and the mixture allowed to cool. The mother liquor is decanted and the crystalline compound extracted with hot alcohol. 15 gms. of pure 2-methyl-3-amino-4-ethoxymethyl-5-cyano-6-chlorpyridine is obtained. From the mother liquor an additional 2.2 gms. is obtained. The total yield is 76% of theory and it melts at 146–148° C.

31 gms. of 2-methyl-3-amino-4-ethoxymethyl-5-cyano-6-chloropyridine in 1400 cc. of glacial acetic acid, containing 11.3 gms. sodium acetate, 0.5 gms. of PtO$_2$ catalyst and 30 gms. of 5% Pd charcoal, is reduced with hydrogen at three atmospheres pressure until three moles have been absorbed. After filtration, the solution is evaporated under diminished pressure and dissolved in water. Crystals of unchanged starting material are removed by filtration, and the solution treated with an alchoholic solution of 70 gms. of picric acid. A picrate separates on scratching and standing, and is recrystallized from alcohol. It melts at 186–187° C. and analyzes for a dipicrate of 2-methyl-3-amino-4-ethoxymethyl-5-amino-methlypyridine. Yield 49 gms., or 54.5% of theory.

The dipicrate of 2-methyl-3-amino-4-ethoxymethyl-5-amino-methylpyridine (38.6 gms.) is treated with 100 cc. of hydrochloric acid (1:1) and the liberated picric acid is extracted first with nitrobenzene and finally with ether until the ether shows no more yellow color. The acid solution is evaporated to a thick syrup under diminished pressure, an equal volume of alcohol is added, and the hydrochloride is crystallized by adding acetone to turbidity, and scratching. Further addition of acetone causes complete crystallization of the dihydrochloride of 2-methyl-3-amino-4-ethoxymethyl-5-aminomethylpyridine. The yield is 12.9 gms. or 81.5% of the theory. The melting point is about 120–130° C. and is raised to 195° C. by recrystallization from absolute alcohol and acetone. The low melting point is apparently due to the hygroscopic nature of the dihydrochloride, but does not prevent subsequent use of the material.

The dihydrochloride of 2-methyl-3-amino-4-ethoxymethyl-5-aminomethylpyridine (4 gms.) is dissolved in 20 cc. of 2N sulfuric acid and added slowly to a hot (90° C.) mixture of 2N sulfuric acid (50 cc.) and sodium nitrite (7.5 gms.) There is an immediate evolution of nitrogen, followed by the formation of slightly yellow solution. The solution is heated for an additional five minutes, treated with just enough urea to decompose the excess nitrous acid, cooled, and neutralized to pH 7.2 with sodium hydroxide solution, using bromothymol blue as an outside indicator. This slightly reddish solution is concentrated under diminished pressure until sodium sulfate starts to separate. At this point a dark oily layer is formed, and contains most of the desired product. It is dissolved in alcohol, filtered from separated sodium sulfate, and evaporated to dryness. The residue is then dissolved in acetone and filtered from separated sodium chloride. This solution gives a strong ferric chloride test for a $\beta$-hydroxy pyridine. Dry hydrogen chloride is added to the acetone solution until it is acid to wet Congo paper. A small amount of an oily layer separates and the acetone layer is decanted. Addition of a small amount of ether gives a second oily layer which is also separated. On further addition of ether and scratching, crystallization commences, and is allowed to continue on standing at 35–40° C. The solution is filtered, yielding 1 gm. of the hydrochloride of 2 - methyl - 3 - hydroxy - 4 - ethoxymethyl - 5-hydroxymethylpyridine, M. P. 110–120° C. This is recrystallized by dissolving in a minimum of absolute alcohol, adding 2–3 volumes of acetone, and finally ether until crystallization takes place, M. P. 123–125° C. This hydrochloride when treated with a base, yields the vitamin B$_6$ ethyl ether free base.

The reactions above described can be employed, with the modifications that will be obvious to those versed in this field of invention, to obtain other ethers of vitamin B$_6$, merely by substituting for the ethoxyacetylacetone other alkyl, aryl, or arylalkyl substituted acetylacetones.

*Example 2*

About 1 g. of vitamin B$_6$ hydrochloride is exactly neutralized with sodium methoxide in methanol and the mixture is heated in a bomb for four hours at a temperature of about 125° C. The solution is removed, evaporated to dryness, dissolved in acetone, filtered, extracted with ether and the ether extract is treated with ethereal hydrogen chloride which causes the product to separate as crystals. The product, 2-methyl-3-hydroxy-4-methoxymethyl - 5-hydroxymethylpyridine hydrochloride, can be crystallized from alcohol. It can be converted to the free base by treatment with alkali.

The hydrochloride of 2-methyl-3-hydroxy-4-ethoxymethyl-5-hydroxymethylpyridine or the hydrochloride of 2-methyl-3-hydroxy-4-propoxymethyl-5-hydroxymethylpyridine can be prepared in the same manner as above described by substituting sodium ethoxide or sodium propoxide in ethanol or propanol respectively for the sodium methoxide in methanol there mentioned.

Example 3

About 2 g. of vitamin B₆ base are refluxed in approximately 20 cc. of benzyl alcohol for about 2 hours, the benzyl alcohol is removed by distillation, and the residue is extracted with ether. The ether extract is evaporated, yielding crystalline material that is recrystallized from alcohol to obtain the product, 2-methyl-3-hydroxy-4-benzyloxymethyl-5-hydroxymethylpyridine, melting at about 166.5° C.

Example 4

About 1 g. of vitamin B₆ base is refluxed in approximately 150 cc. of n-butanol for about 25 hours, the alcohol is removed and the residue is extracted with ether. The ether extract is treated with alcoholic hydrogen chloride, which produces a fluffy white precipitate of the butyl ether of vitamin B₆ hydrochloride having the empirical formula $C_{12}H_{20}O_3NCl$ and the structural formula

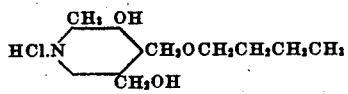

M. P. 127–128° C. The salt can be converted to the vitamin-ether base by treatment with alkali.

Although in the foregoing examples the preparation of the vitamin derivatives having 4-methoxymethyl, 4-ethoxymethyl, 4-propoxymethyl, 4-butoxymethyl, and 4-benzyloxymethyl substituents has been described, the substitution of homologs or chemical equivalents for the substances used is to be clearly understood as within the scope of the present invention. It also will be recognized that the conditions of reaction can be altered to a minor extent without departure from the spirit or teachings of this invention.

What is claimed is:

1. Compositions of matter represented by the formula:

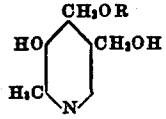

wherein R is selected from the class consisting of alkyl, aryl and arylalkyl groups; and salts thereof.

2. The composition of matter set forth in claim 1 when R is ethyl.

3. The composition of matter set forth in claim 1 when R is butyl.

4. The composition of matter set forth in claim 1 when R is benzyl.

5. The process that comprises heating together vitamin B₆ and a substance selected from the class consisting of alkyl hydroxyl compounds, aryl hydroxyl compounds, and arylalkyl hydroxyl compounds to produce a compound represented by the formula

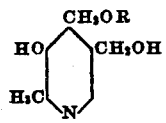

wherein R is selected from the class consisting of alkyl, aryl and arylalkyl groups.

6. The process set forth in claim 5 wherein the alkyl hydroxyl compound is ethanol and R is ethyl.

7. The process set forth in claim 5 wherein the alkyl hydroxyl compound is butanol and R is butyl.

8. The process set forth in claim 5 wherein the arylalkyl hydroxyl compound is benzyl alcohol and R is benzyl.

STANTON A. HARRIS.